JAMES H. BRIGGS' imp'ts in FINE TOOTH COMBS.

2822

Reissued

Dec 311868

Witnesses.

W. A. Dey

C. C. Livings

Signature.

James H. Briggs

UNITED STATES PATENT OFFICE.

JAMES H. BRIGGS, OF BROOKLYN, NEW YORK.

IMPROVEMENT IN COMBS.

Specification forming part of Letters Patent No. 69,755, dated October 15, 1867; Reissue No. 2,822, dated December 31, 1867.

*To all whom it may concern:*

Be it known that I, JAMES H. BRIGGS, of the city of Brooklyn, in the county of Kings and State of New York, have invented a new and useful Improvement in Fine-Tooth Combs; and I do hereby declare that the following is a full, clear, and exact description thereof.

It is well known that fine-tooth combs, especially those made of ivory, are very tender, and consequently very apt to break. It is also known that whenever one of the teeth should be broken out the comb will be useless for the market. My invention not only successfully strengthens fine and weak combs, but by its means I am also able to use parts of an injured comb, as I can use the uninjured half of the comb by connecting it with another similar one. By my invention, moreover, a very large quantity of material is saved, as I can use halves on which scarcely more than one-eighth of an inch of material is left besides the teeth. In using combs of which one or more teeth are broken out, I cut out the injured part, and fit the other parts together, a joint not being noticeable when the parts are firmly clamped between the central part or parts. The combs herein referred to can be made of ivory, horn, rubber, or any other suitable material, and may be provided with teeth of any desired fineness or coarseness. If ivory is used my invention is still more valuable. A process has been invented whereby the ivory is cut spirally in shavings of the necessary thickness. This process could not be employed for the common combs, as they would be too apt to retain or regain their curved shape. By my metal part or parts, secured as hereinafter specified, I can hold the combs and prevent them from curving or warping, and thus I can make use of the spiral shavings of the tusk.

I will first describe what I consider the best means of carrying out my invention, and will afterward designate the point which I believe to be new therein.

The accompanying drawings form a part of this specification.

Figure 1:
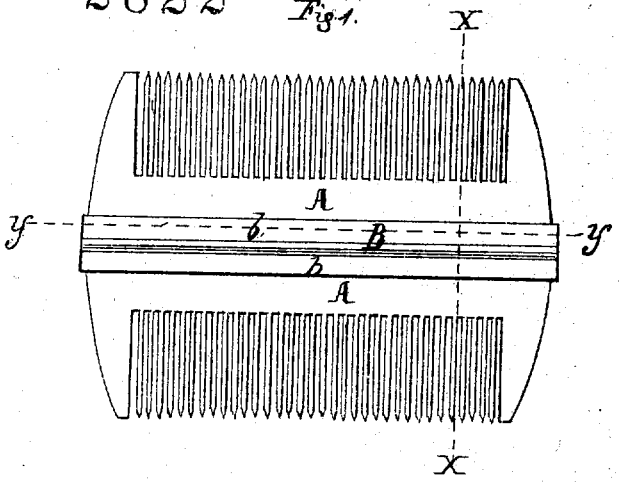
Figure 2:
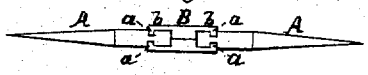
Figure 3:
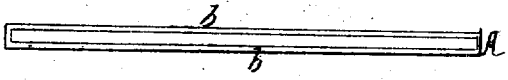
Figure 4:
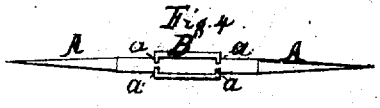
Figure 5:
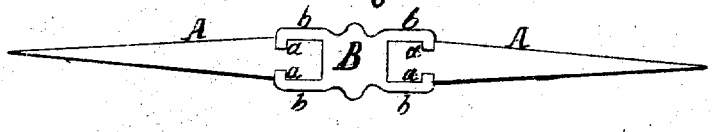

Figure 1 is a side view of my improved comb. Fig. 2 is a cross-section of the same taken on the line *x x*, Fig. 1. Fig. 3 is a longitudinal section of the same taken on line *y y*, Fig. 1. Fig. 4 is a cross-section of a whole comb strengthened by metal bands. Fig. 5 is a cross-section of one form of my invention on a larger scale.

Similar letters of reference indicate like parts in all the figures.

Referring to Figs. 1, 2, and 3, two half-combs, A A, are connected and joined by a metal part or strip, B, which may be split, as represented, or may be formed in one piece, and which is provided with flanges *b*, which fit over shoulders *a*, into grooves cut into the parts A A. The outside of this metal may be ornamented in any suitable manner. The flanges *b* are pressed together in such a manner that they will not come apart with use, and that they will safely and securely hold the two or more pieces of the comb.

In Fig. 4 the main parts A A are formed in a single part, which is strengthened by my metal band or strips B, joined at the ends, and is thereby prevented from curving or warping and from breaking easily.

I am aware that two halves of combs have already been joined by ivory or horn straps, but they could not be secured without the use of rivets, and the latter are objectionable for the brittle material of which fine-tooth combs are generally made. Moreover, it is a very tedious and costly process to secure these rivets in place and to adapt the combs to the same. My invention is better also for the reason, among others, that the ivory or other material of the part or parts A is allowed to diminish or increase its length without being hindered by rivets, and without any consequent strain and tendency to split or break.

I do not esteem it essential that grooves be specially provided to secure the flanges *b*, as it will be obvious that the inner edges of the grooves, which I designate the "shoulders" *a*, perform the whole function of holding the parts firmly together.

The outer edges of the groove may be dispensed with, if preferred, and the part or parts A may be finished outwardly of only the same thickness as the space between the flanges *b*.

Having now fully described my invention, what I claim as new, and desire to secure by Letters Patent, is as follows:

The longitudinal flanges *b*, on the metallic part B, constructed as described, and fitting over longitudinal shoulders *a*, in the part or parts A, as herein set forth, for the purpose specified.

JAMES H. BRIGGS.

Witnesses:
W. C. DEY,
C. C. LIVINGS.